Patented June 26, 1951

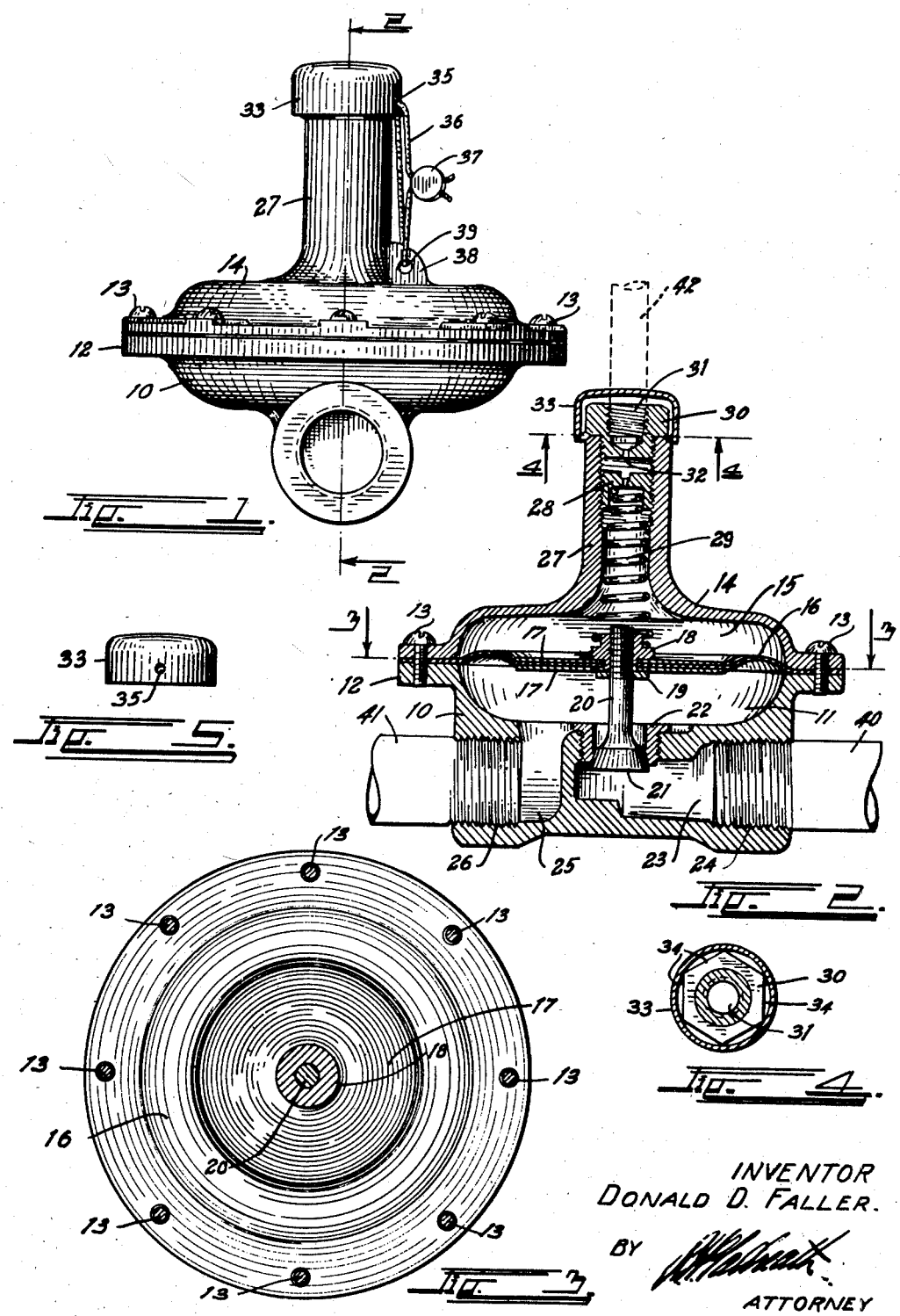

2,558,292

UNITED STATES PATENT OFFICE 2,558,292

CLOSURE FOR PRESSURE REDUCING VALVES

Donald D. Faller, Denver, Colo., assignor, by mesne assignments, to Penn Electric Switch Co., Goshen, Ind., a corporation of Iowa Application August 19, 1946, Serial No. 691,464

1 Claim. (Cl. 220—39)

This invention relates to a pressure-reducing valve, more particularly for low pressure gas service such as used on conventional household heating appliances, and has for its principal object the provision of a valve which will be positive and accurate in operation and which will have a minimum of working parts to get out of order.

Another object of the invention is to provide a highly efficient sealing means for a pressure-reducing valve which will prevent unauthorized tampering or adjusting; which will prevent foreign material from entering the valve; and which will prevent back pressure from building up in the valve.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an end view of the improved pressure-reducing valve;

Fig. 2 is a vertical, longitudinal section therethrough, taken on the line 2—2, Fig. 1;

Fig. 3 is a horizontal section, taken on the line 3—3, Fig. 2;

Fig. 4 is a detail section, taken on the line 4—4, Fig. 2, and

Fig. 5 is detail view of a sealing cap employed in the improved valve.

The improved valve consists of a body portion 10 having a circular pressure concavity 11 in its top. The pressure concavity 11 is surrounded by a peripheral screw flange 12 having a plurality of threaded screw holes to receive clamp screws 13. A cover member 14 having an atmospheric concavity 15 in its bottom is held in place on the body portion 10 by means of clamp screws 13.

A flexible diaphragm 16 is clamped between the peripheral edges of the body portion 10 of the cover member 14 by the clamping action of the screws 13. The diaphragm 16 is clamped between two diaphragm plates 17 by means of upper and lower nuts 18 and 19, respectively. The nuts are threaded on a valve stem 20 leading to a tapered valve 21.

A removable annular valve seat 22 surrounds the valve 21. The seat 22 is threaded into the body portion 10 and communicates between the pressure concavity 11 and an intake chamber 23. The chamber 23 is internally threaded, as shown at 24, to receive a supply pipe 40. A discharge chamber 25 also communicates with the pressure concavity 11. The discharge chamber is also internally threaded, as shown at 26, for connection to a discharge pipe 41.

A hollow spring tube 27 arises from the cover member 14. The upper portion of the spring tube 27 is internally threaded to receive a perforated spring adjusting nut 28. A compression spring 29 is compressed between the nut 28 and the nut 18 on the diaphragm 16.

A bleed bushing 30 is threaded into the upper extremity of the spring tube 27. The bushing 30 contains a threaded pipe socket 31, from which a bleed port 32 leads into the hollow interior of the tube 27. The external surface of the bushing 30 is hexagonal to provide wrench-engaging faces 34 projecting above the spring tube. A cup-shaped sealing cap 33, having an internal diameter to frictionally engage the intersecting edges of the hexagonal wrench faces 34 is forced downwardly over the bushing 30. The sealing cap is provided with an opening 35 in its side for receiving a tie wire of a lead seal 37. A seal ear 38 having a wire opening 39 is formed on the cover member 14. The sealing wire 36 is passed through both openings 35 and 39 before the seal 37 is applied.

It will be noted that, after the spring adjusting nut 28 has been set to place the proper compression in the spring 29, the entire device can be sealed against unauthorized tampering or adjusting by placing the bushing 30 in place, forcing the locking cap thereover and applying the sealing wire 36 and seal 37. It is impossible for anyone to reach the nut 28 without breaking the seal since the cap prevents removal or rotation of the bushing 30.

The cap does not prevent the escape of back pressure from the atmospheric concavity 15, since this pressure can readily flow through the open spaces between the nut faces and the cap 33, as shown in Fig. 4. Of course, any leakage through the diaphragm will also escape through these spaces. In installations where the escape of such leakage would not be desirable, a bleed pipe such as indicated in broken line at 42, Fig. 2, can be threaded into the pipe socket 31 and lead to any desired discharge or escape. The bleed pipe replaces the cap 33.

The operation of the device is similar to the conventional pressure-reducing valve. Briefly, the compression in the spring 29 is regulated to force the diaphragm 16 downwardly so as to hold the valve 21 open at any predetermined pressure. Whenever the pressure in the pressure concavity 11 exceeds this predetermined pressure, the diaphragm will act against the spring 29 to force the valve 21 closed until the pressure in the outlet chamber returns to the predetermined normal. Any surges in the intake pressure will force the valve closed to prevent an oversupply of gas from reaching the burner.

While a specific form of the improvement has been described and illustrated herein, it is desired to be understood that the same may be varied, within the scope of the appended claims without departing from the spirit of the invention.

Having thus described the invention, what is claimed and desired secured by Letters Patent is:

Covering means for pressure regulating valves of the type having a cover portion and a spring tube projecting therefrom, comprising: a hexagonal bushing threaded into said spring tube, the hexagonal faces of said bushing extending above said tube; a threaded pipe socket in said bushing; a bleed port communicating between said tube and said socket; and a cup-shaped cap frictionally engaging the edges between the said wrench faces; a perforated ear formed on said cover portion; a second perforation formed in said cup-shaped cap; and a sealing device extending between said perforations to prevent unauthorized removal of said cup-shaped member.

DONALD D. FALLER.

REFERENCES CITED

The following references are of record in the file of this patent:

UNITED STATES PATENTS

| Number | Name | Date |
| --- | --- | --- |
| 784,331 | Keller | Mar. 7, 1905 |
| 1,166,358 | Grant | Dec. 28, 1915 |
| 1,217,901 | Bastian | Mar. 6, 1917 |
| 1,724,346 | Ford | Aug. 13, 1929 |
| 1,748,923 | Rieke | Feb. 25, 1930 |
| 1,795,201 | Dashwood | Mar. 3, 1931 |
| 1,897,517 | Hughes | Feb. 14, 1933 |
| 1,940,601 | McCrery et al. | Dec. 19, 1933 |
| 2,027,143 | Anderson | Jan. 7, 1936 |